United States Patent
Jeong et al.

(10) Patent No.: US 9,583,795 B2
(45) Date of Patent: Feb. 28, 2017

(54) BATTERY PACK (71) Applicant: Samsung SDI Co., Ltd., Yongin-si, Gyeonggi-do (KR)

(72) Inventors: Ik-Jae Jeong, Yongin-si (KR); Min-Cheol Bae, Yongin-si (KR); Kyoung-Hwan Noh, Yongin-si (KR); Hong-Keun Choi, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 308 days.

(21) Appl. No.: 14/249,131

(22) Filed: Apr. 9, 2014

(65) Prior Publication Data

US 2015/0079437 A1    Mar. 19, 2015

(30) Foreign Application Priority Data

Sep. 13, 2013  (KR) .................. 10-2013-0110616

(51) Int. Cl.
*H01M 10/42* (2006.01)
*H01M 10/48* (2006.01)
*H01M 2/10* (2006.01)

(52) U.S. Cl.
CPC ..... *H01M 10/4257* (2013.01); *H01M 2/1077* (2013.01); *H01M 10/486* (2013.01); *H01M 2200/10* (2013.01)

(58) Field of Classification Search
CPC .. H01M 2/0202; H01M 2/1055; H01M 2/206; H01M 2/1077; H01M 2/0217; H01M 10/4257
See application file for complete search history.

(56) References Cited

U.S. PATENT DOCUMENTS

| 3,384,514 | A | * | 5/1968 | Strobel | ............... H01M 2/0202 |
| | | | | | 429/176 |
| 3,416,373 | A | * | 12/1968 | Havens | .................... G01D 5/12 |
| | | | | | 257/467 |
| 3,484,301 | A | * | 12/1969 | Gray | ................... H01M 2/1223 |
| | | | | | 220/203.11 |

(Continued)

FOREIGN PATENT DOCUMENTS

JP   2004-362996 A   12/2004
JP   2011-034883 A    2/2011

(Continued)

OTHER PUBLICATIONS

Extended European Search Report dated Jan. 30, 2015 for European Patent Application No. EP 14 182 287.4 which shares priority of Korean Patent Application No. KR 10-2013-0110616 with captioned U.S. Appl. No. 14/249,131.

(Continued)

*Primary Examiner* — Kenneth Douyette
(74) *Attorney, Agent, or Firm* — Knobbe Martens Olson & Bear LLP (57) ABSTRACT

A battery pack is disclosed. In one aspect, the battery pack includes a battery cell, a temperature sensor configured to measure the temperature of the battery cell, and an inner cover substantially covering the battery cell. The inner cover includes a sensor attachment fixing the temperature sensor to the battery cell. The battery pack has a structure for easily attaching the temperature sensor to the battery cell.

17 Claims, 5 Drawing Sheets

(56) References Cited

U.S. PATENT DOCUMENTS

| | | | |
|---|---|---|---|
| 6,566,005 B1* | 5/2003 | Shimma | H01M 2/1055 429/120 |
| 2003/0162084 A1 | 8/2003 | Shigeta et al. | |
| 2010/0310909 A1* | 12/2010 | Yun | H01M 2/206 429/90 |
| 2011/0097620 A1 | 4/2011 | Kim | |
| 2012/0214046 A1* | 8/2012 | Lim | H01M 2/1077 429/151 |
| 2012/0251874 A1* | 10/2012 | Guen | H01M 2/0217 429/179 |
| 2012/0301747 A1 | 11/2012 | Han et al. | |
| 2013/0266833 A1 | 10/2013 | Kim | |
| 2014/0023893 A1 | 1/2014 | Shimizu et al. | |

FOREIGN PATENT DOCUMENTS

| | | |
|---|---|---|
| JP | 2012-038468 A | 2/2012 |
| KR | 10-2003-0065380 A | 8/2003 |
| KR | 10-2011-004130 A | 4/2011 |
| KR | 10-2011-0044130 A | 4/2011 |

OTHER PUBLICATIONS

Korean Office Action dated Jul. 6, 2016 for Korean Patent Application No. KR 10-2013-0110616, which cites the above-identified references numbered 1-2, and from which priority is claimed by subject U.S. Appl. No. 14/249,131.

* cited by examiner

BATTERY PACK

CROSS-REFERENCE TO RELATED APPLICATIONS

This application claims the benefit of Korean Patent Application No. 10-2013-0110616, filed on Sep. 13, 2013, in the Korean Intellectual Property Office, the disclosure of which is incorporated herein in its entirety by reference.

BACKGROUND

Field

The described technology generally relates to a battery pack.

Description of the Related Technology

In contrast to primary batteries, secondary batteries are rechargeable. Secondary, or rechargeable, batteries are widely used as energy sources in devices such as mobile electronic devices, electric vehicles, hybrid electric vehicles, electric bicycles, and uninterruptible power supplies. Either single-cell secondary batteries or multi-cell secondary batteries (secondary battery packs) in which a number of cells are connected can be used based on the external devices using the secondary batteries.

Small mobile devices such as cellular phones may be operated for a limited period of time using single-cell secondary batteries before the next recharge. However, battery packs having a high-output and high-capacity are more suitable for devices having long operating times and consuming large amount of power such as electric vehicles or hybrid electric vehicles. The output voltage or current of battery packs may be increased to meet the usage requirements of these high power devices by adjusting the number of battery cells included in the battery packs.

Temperature sensors may be attached to such battery packs to measure the temperatures of battery cells included in the battery packs to predict the possibility of an explosion caused by overheating in order to prevent these explosions. Such temperature sensors are typically assembled using screws.

SUMMARY OF CERTAIN INVENTIVE ASPECTS

One inventive aspect is a battery pack having a structure for easily attaching a battery cell temperature sensor.

Another aspect is a battery pack including a battery cell, a temperature sensor configured to measure the temperature of the battery cell, and an inner cover substantially covering the battery cell, the inner cover including a sensor assembling part fixing the temperature sensor to the battery cell.

The sensor assembling part may push the temperature sensor against the battery cell.

The sensor assembling part may include a cantilever member and the cantilever member may have a fixed end connected to a cover body and an opposite free end not connected to the cover body.

When the temperature sensor is assembled, the temperature sensor may slide toward the fixed end while pushing up the free end and the cantilever member may push the temperature sensor against the battery cell by resilience thereof.

The cantilever member may include a pressure adjusting part and the distance between pressure adjusting part and the battery cell may decrease in a direction from the fixed end to the free end.

The pressure adjusting part may be sloped downwardly toward the battery cell.

A catch jaw may be formed on a lower side of the free end to substantially prevent separation of the temperature sensor from the sensor assembling part.

The catch jaw may have a wedge shape sloped in an assembling direction of the temperature sensor.

The cantilever member may include a stopper formed between the fixed end and free end to regulate the position of the temperature sensor.

The sensor assembling part may include a pair of guide walls to guide the temperature sensor during assembly.

A cantilever member may be disposed between the guide walls to apply pressure to the temperature sensor.

The temperature sensor may be placed between the guide walls under the cantilever member.

The guide walls may include assembling position guide parts having a width therebetween which decreases in the assembling direction of the temperature sensor.

The battery cell may include a plurality of battery cells, the battery cells may be electrically connected to each other through a plurality of bus bars and the inner cover may further include a bus bar assembling part defining the positions of the bus bars.

The bus bars may be disposed above or below the bus bar assembling part.

A pair of terminal holes may be formed in the bus bar assembling part to expose neighboring electrode terminals of the battery cells.

The bus bar assembling part may include an assembling guide enclosing a corner of the bus bar to define the positions of the bus bars.

The bus bar assembling part may include four assembling guides corresponding to four corners of the bus bars.

The inner cover may be formed of an injection-molded electrical insulator.

The battery cell may include a plurality of battery cells and the inner cover may substantially cover the battery cells.

Another aspect is a battery pack including a battery cell, a temperature sensor, and an inner cover substantially covering the battery cell, wherein the inner cover includes a sensor attachment configured to apply pressure to the temperature sensor to fix the temperature sensor to the battery cell.

The sensor attachment may further include a cantilever member configured to apply the pressure to the temperature sensor. The sensor attachment may further include a cover body and the cantilever member includes a fixed end connected to the cover body and an opposite free end not connected to the cover body.

DETAILED DESCRIPTION OF CERTAIN INVENTIVE EMBODIMENTS

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 1:
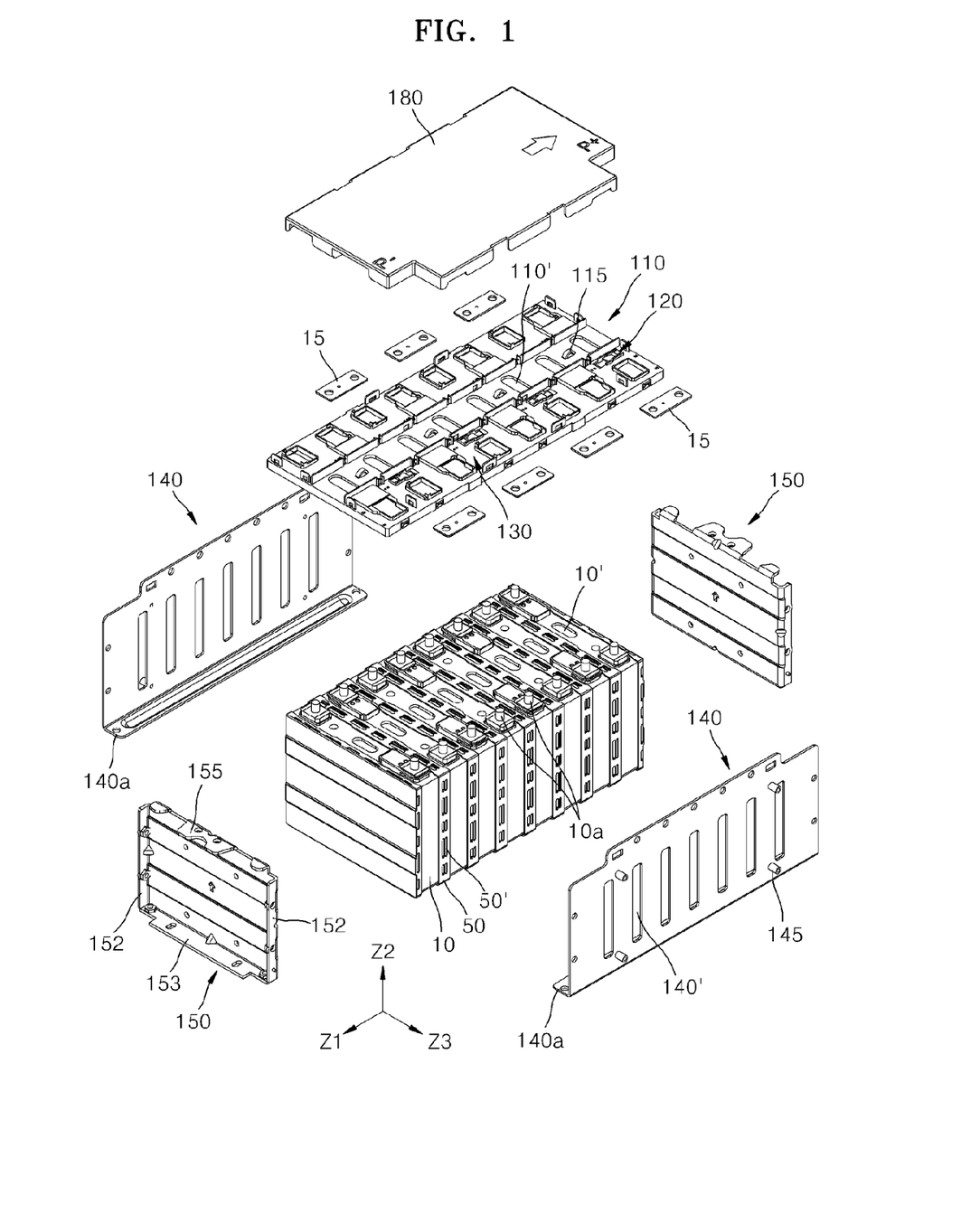
FIG. 1 is an exploded perspective view illustrating a battery pack according to an embodiment.

A battery pack will now be described in detail with reference to the accompanying drawings, in which exemplary embodiments of the described technology are shown. FIG. 1 is an exploded perspective view illustrating a battery pack according to an embodiment. Referring to FIG. 1, the battery pack includes a plurality of battery cells 10 arranged in an arrangement direction Z1, and side and end plates 140 and 150 surrounding the battery cells 10.

Figure 2:
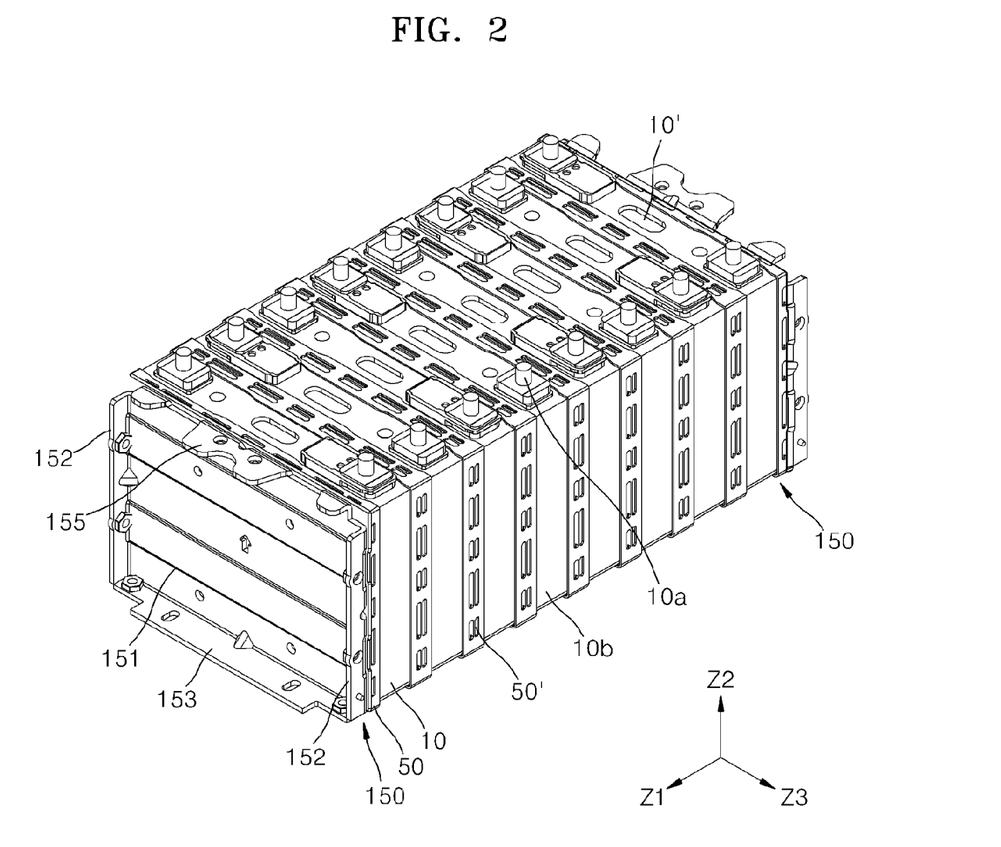
FIG. 2 is a perspective view illustrating an arrangement of battery cells depicted in FIG. 1.

FIG. 2 is a perspective view illustrating the battery cells 10 depicted in FIG. 1. Referring to FIGS. 1 and 2, the battery cells 10 may be secondary battery cells such as lithium ion battery cells. The battery cells 10 may have any shape such as a cylindrical or prismatic shape. In addition, the battery cells 10 may be any type of battery cells such as polymer battery cells. That is, the battery cells 10 are not limited to any shape or type.

In the present embodiment, each of the battery cells 10 includes a case 10b, an electrode assembly (not shown) disposed in the case 10b, and electrode terminals 10a electrically connected to the electrode assembly and exposed to the exterior of the case 10b. The electrode terminals 10a exposed to the exterior of the case 10b protrude from the top side of the case 10b. Although not shown, the electrode assembly may include a positive electrode, a separator, and a negative electrode. The electrode assembly may be a jelly-roll or stack type electrode assembly. The case 10b accommodates the electrode assembly and the electrode terminals 10a are exposed to the exterior of the case 10b for electric connection with an external circuit.

According to some embodiments, neighboring battery cells 10 are electrically connected to each other by connecting the electrode terminals 10a of the neighboring battery cells 10. For example, neighboring battery cells 10 may be electrically connected to each other in series, in parallel or in a combination thereof by connecting the electrode terminals 10a of the neighboring battery cells 10.

A safety vent 10' may be formed in the case 10b. The safety vent 10' is relatively weak so that if the pressure inside of the case 10b increases to a critical level or higher, the safety vent 10' may be fractured to release gas from the inside of the case 10b.

Spacers 50 may be disposed between neighboring battery cells 10. The spacers 50 may electrically insulate the neighboring battery cells 10 from each other. For example, the cases 10b of the battery cells 10 may each have an electric charge and the spacers 50 may be formed of an electrically insulating material and disposed between the cases 10b to substantially prevent electric interference between neighboring pairs of battery cells 10.

In addition, the spacers 50 may function as heat-dissipating paths between the battery cells 10. To this end, heat-dissipating holes 50' may be formed in the spacers 50. Heat-dissipating holes 140' (refer to FIG. 1) may be formed in the side plates 140, which cover sides of the spacers 50 as described later, and the heat-dissipating holes 140' of the side plates 140 may be aligned with the heat-dissipating holes 50' of the spacers 50 to form heat-dissipating paths between the battery cells 10.

The spacers 50 may be disposed between the battery cells 10 and may substantially prevent thermal expansion (swelling) of the battery cells 10. The cases 10b of the battery cells 10 are formed of a deformable material such as metal. Thus, the spacers 50 may be formed of a less deformable material such as polymer to suppress swelling of the battery cells 10.

The spacers 50 may be disposed on outermost sides of the battery cells 10 in the arrangement direction Z1 as well as between the battery cells 10. That is, as shown in the embodiment of FIG. 2, the end plates 150 are disposed on both ends of the battery cells 10 in the arrangement direction Z1 and spacers 50 are disposed between the end plates 150 and the outermost battery cells 10.

A pair of end plates 150 are provided on both ends of the battery cells 10 in the arrangement direction Z1 of the battery cells 10. The sides of the end plates 150 face outer sides of the battery cells 10. In detail, the sides of the end plates 150 may face spacers 50 disposed on the outer sides of the battery cells 10.

The end plates 150 are combined with the battery cells 10 to form a unit. During charging and discharging of the battery cells 10, the end plates 150 substantially prevent expansion of the battery cells 10 and maintain the resistive characteristics of the battery cells 10, and thus, the electric characteristics of the battery cells 10 are substantially prevented from being lowered.

Each of the end plates 150 may include a base plate 151, and flanges 152, 153, and 155 bent from the base plate 151 in a direction away from to the battery cells 10. The base plate 151 may have a sufficient area to substantially cover a corresponding side of the battery cells 10.

The flanges 152, 153, and 155 are bent from the edges of the base plate 151 in a direction away from to the battery cells 10. The flanges 152, 153, and 155 may include a pair of lateral flanges 152 formed on both lateral sides of the base plate 151 and upper and lower flanges 155 and 153 formed on the upper and lower sides of the base plate 151.

Referring to FIG. 1, the flanges 152, 153, and 155 of the end plates 150 are coupling positions at which neighboring elements are coupled to the end plates 150. For example, the flanges 152, 153, and 155 of the end plates 150 may be coupled to edge portions of the side plates 140. In addition, the flanges 152, 153, and 155 may enhance the mechanical strength of the end plates 150.

The lateral flanges 152 of the end plates 150 may be coupling positions at which the side plates 140 are coupled to the end plates 150. For example, the side plates 140 may be coupled to the end plates 150 by placing end portions of the side plates 140 on the lateral flanges 152 and fastening the edge portions of the side plates 140 to the lateral flanges 152 using screws. For this, a plurality of coupling holes may be formed in the lateral flanges 152.

In some embodiments, the side plates 140 are disposed on both lateral sides of the battery cells 10. In other words, the side plates 140 substantially cover both lateral sides of the battery cells 10 arranged in the arrangement direction Z1. The pair of side plates 140 are provided on opposite lateral sides of the battery cells 10. The side plates 140 extend in the arrangement direction Z1 of the battery cells 10. Ends of the side plates 140 may be coupled to the end plates 150 disposed on opposite ends of the battery cells 10. The side plates 140 may be coupled to the lateral flanges 152 formed on lateral edges of the end plates 150 by placing the lateral flanges 152 on the side plates 140, aligning the coupling holes of the lateral flanges 152 and the side plates 140, and fastening the lateral flanges 152 and the side plates 140 using fasteners such as bolts and nuts. At this time, at least portions of the side plates 140 and the lateral flanges 152 may be in surface contact with each other.

The side plates 140 may have a substantially plate shape. The side plates 140 may have catch jaws 140a to support portions of the bottom sides of the battery cells 10. The side plates 140 may be disposed on the opposite lateral sides of the battery cells 10 and the catch jaws 140a may be bent from the side plates 140 to face each other and support the bottom sides of the battery cells 10.

The catch jaws 140a may extend along the entire lengths of the side plates 140 in the arrangement direction Z1 of the battery cells 10 and end portions of the catch jaws 140a may be coupled to the lower flanges 153 of the end plates 150 using screws. To this end, coupling holes may be formed in the catch jaws 140a and the lower flanges 153. For example, the side plates 140 and the end plates 150 may be coupled by aligning the coupling holes of the catch jaws 140a and the lower flanges 153 and inserting fasteners into the coupling holes and tightening the fasteners. The catch jaws 140a and the lower flanges 153 may make surface contact with each other at corners of the battery pack. In this way, the side plates 140 may be fastened to the lower flange 153 and the lateral flanges 152 of the end plates 150 to form an accommodation space for receiving the battery cells 10.

The heat-dissipating holes 140' may be formed in the side plates 140. For example, the heat-dissipating holes 140' may be formed at regular intervals in the arrangement direction Z1 of the battery cells 10. Air may flow to the battery cells 10 through the heat-dissipating holes 140', and thus, heat may be rapidly dissipated from the battery cells 10 during operation of the battery cells 10.

The bottom sides of the battery cells 10 may be exposed except for the portions supported by the catch jaws 140a of the side plates 140. Consequently, air may flow between the battery cells 10 through the bottom sides of the battery cells 10 to cool the battery cells 10.

Boss members 145 may be formed on the side plates 140 to attach a circuit board (not shown) to the boss members 145. For example, the circuit board may be a battery management system (BMS) board. In some embodiments, the sides of the side plates 140 face the battery cells 10 and the circuit boards are attached to the other sides of the side plates 140. The circuit board may monitor and control charging and discharging of the battery cells 10.

As shown in FIG. 1, the boss members 145 are disposed at four positions corresponding to the substantially rectangular or square shape of the circuit board. In other embodiments, the number of boss members 145 may be multiples of four and a plurality of circuit boards may be attached to the boss members 145. The circuit boards may have coupling holes (not shown) and screws may be inserted in the coupling holes of the circuit boards and the boss members 145 of the side plates 140 to fix the circuit boards to the side plates 140.

An inner cover 110 is disposed on the topsides of the battery cells 10. The inner cover 110 substantially covers the entirety of battery pack. For example, the inner cover 110 may substantially cover all the battery cells 10 of the battery pack.

For example, the inner cover 110 may have a substantially rectangular plate shape having a length in the arrangement direction Z1 of the battery cells 10 and a width in the width direction Z3 of the battery cells 10.

The inner cover 110 may be assembled with the side and end plates 140 and 150 to provide an accommodation space for the battery cells 10. For example, the inner cover 110 may be assembled between the end plates 150 in the arrangement direction Z1 and between the side plates 140 in the width direction Z3. In some embodiments, the inner cover 110 maintains the distance between the pair of end plates 150 and the distance between the pair of side plates 140, and thus, the inner cover 110 adds to the strength of the battery pack so that the battery pack can resist axial bending and twisting.

A plurality of openings 110' may be provided in the inner cover in the arrangement direction Z1 of the battery cells 10. The openings 110' may be formed at positions corresponding to the positions of the safety vents 10' of the battery cells 10 so as not to block air-discharge passages of the safety vent 10'.

The inner cover 110 may include wire guides 115 to guide wires (not shown) extending from the electrode terminals 10a of the battery cells 10 or bus bars 15. The wire guides 115 may be formed in one piece with the inner cover 110 and have a substantially ring shape. For example, ties (not shown) each binding a plurality of wires may be fixed to the wire guides 115, and thus, the wires held by the wire guides 115 through the ties may be prevented from being tangled or twisted. That is, the wires may be guided to the outside of the battery pack by the wire guides 115 arranged in a row.

Figure 3:
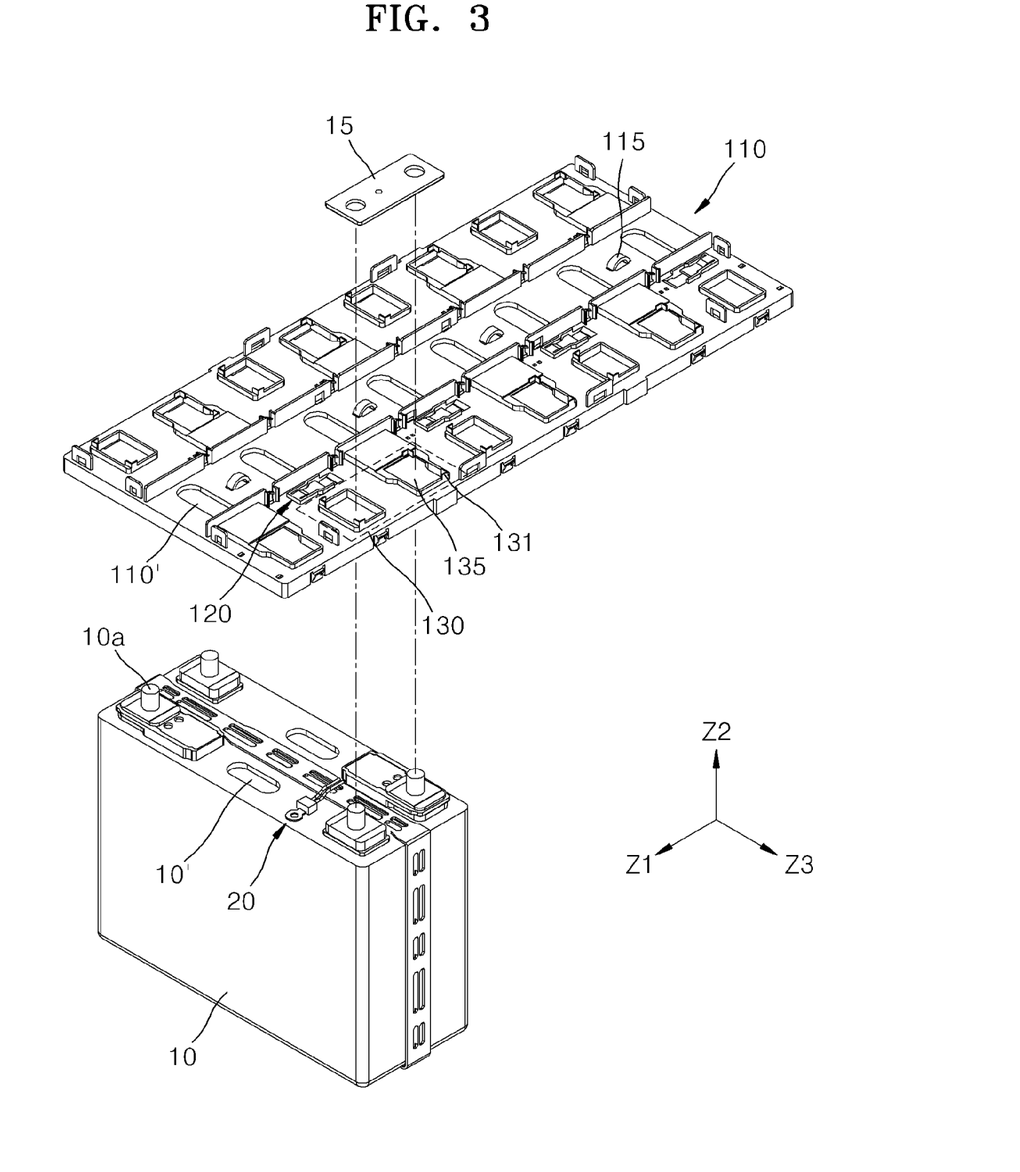
FIG. 3 is a perspective view illustrating an inner cover depicted in FIG. 1.

FIG. 3 is a perspective view illustrating the inner cover 110 depicted in FIG. 1.

Referring to FIG. 3, the inner cover 110 includes sensor assembling parts (or sensor attachments) 120 to fix temperature sensors 20 thereto. In some embodiments, the sensor assembling parts 120 are formed in one piece with the inner cover 110. The sensor assembling parts 120 bring the temperature sensors 20 into contact with the topsides of the battery cells 10 and push the temperature sensors 20 against the topsides of the battery cells 10. Since the temperature sensors 20 are brought into tight contact with the battery cells 10 by the sensor assembling parts 120, the temperatures of the battery cells 10 can be precisely measured.

Figure 4A:
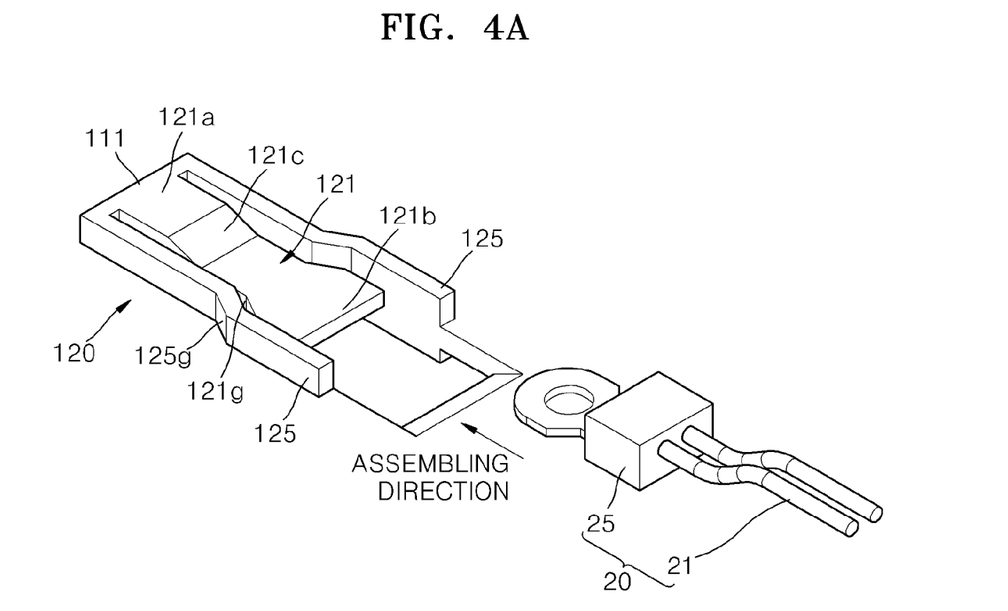
FIGS. 4A and 4B are perspective views illustrating one of the sensor assembling parts depicted in FIG. 3.
Figure 4B:
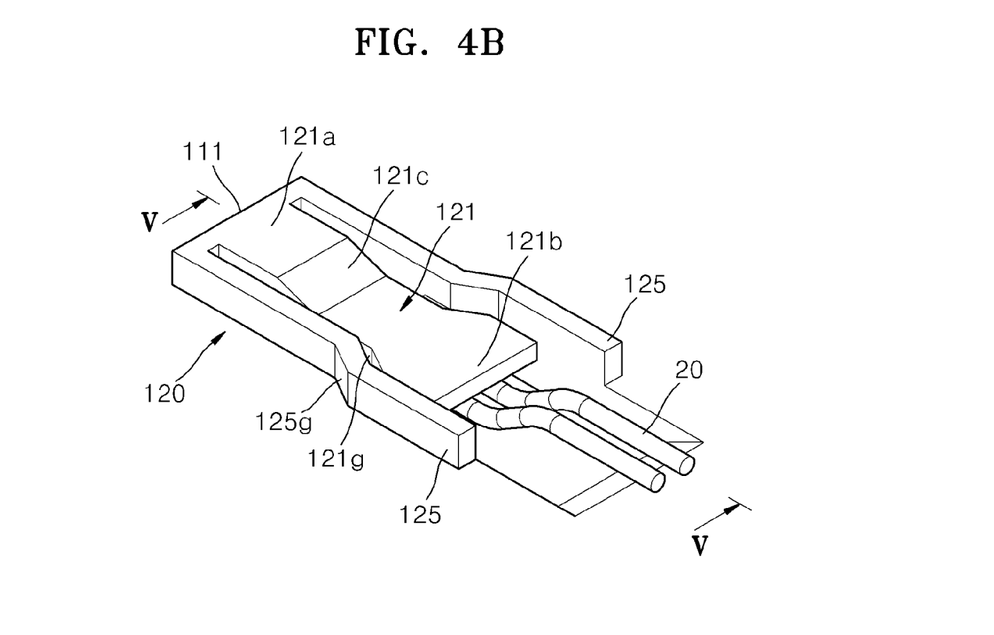
Figure 5:
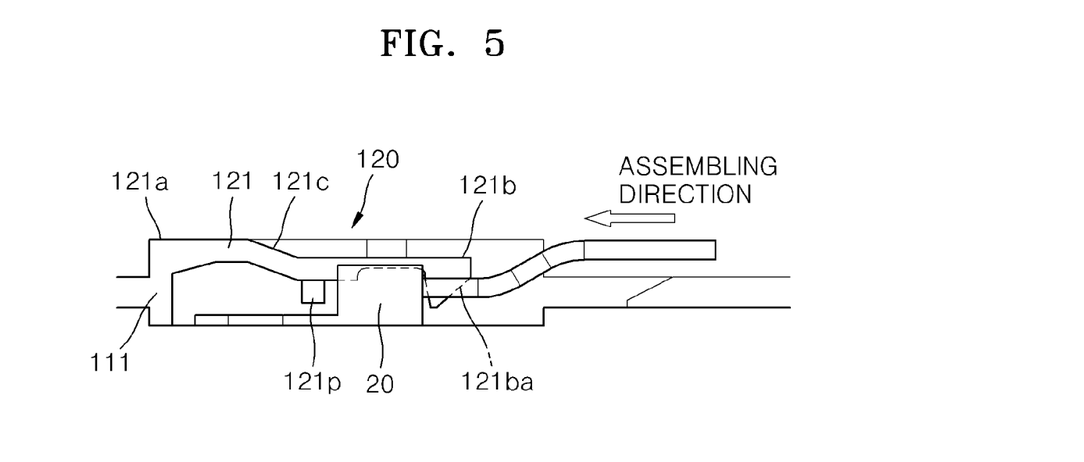
FIG. 5 is a cross-sectional view taken along line V-V of FIG. 4B.
Figure 6:
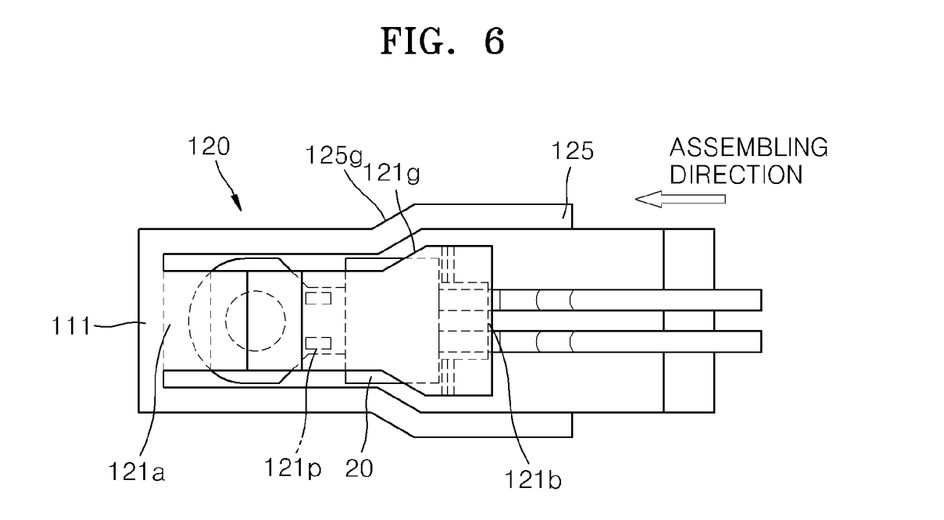
FIG. 6 is a plan view illustrating the sensor assembling part.

FIGS. 4A and 4B are perspective views illustrating one of the sensor assembling parts 120 depicted in FIG. 3. FIG. 5 is a cross-sectional view taken along line V-V of FIG. 4B. FIG. 6 is a plan view illustrating the sensor assembling part 120.

Referring to FIGS. 4A and 4B, the sensor assembling part 120 includes a cantilever member 121. The cantilever member 121 includes a fixed end 121a connected to a cover body 111 and a free end 121b that is opposite to the fixed end 121a and not connected to the cover body 111. In other words, the fixed end 121a of the cantilever member 121 is connected to the cover body 111 and the free end 121b of the cantilever member 121 is located opposite to the fixed end 121a and is not connected to the cover body 111.

During assembly, the temperature sensor 20 slides toward the fixed end 121a of the cantilever member 121 while pushing up the free end 121b of the cantilever member 121. As a result, the temperature sensor 20 is assembled under the cantilever member 121. At this time, the cantilever member 121 is elastically deformed by the temperature sensor 20, and thus, the temperature sensor 20 is pushed against the topside of a battery cell 10 by the resilience of the cantilever member 121.

The cantilever member 121 includes a pressure adjusting part (or pressure adjusting portion) 121c with a decreasing distance to the battery cell 10 in the direction from the fixed end 121a to the free end 121b. For example, the pressure adjusting part 121c may be sloped or stepped downwardly toward the battery cell 10.

The pressure adjusting part 121c may be formed along a selected portion or the entirety of the length of the cantilever member 121 in the direction from the fixed end 121a to the free end 121b. The magnitude of the force pressing on the temperature sensor 20 may be adjusted based on the shape of the pressure adjusting part 121c. For example, the magnitude of the force pressing on the temperature sensor 20 may be adjusted by varying the length of the pressure adjusting part 121c or the total offset of the pressure adjusting part 121c along the length thereof.

Referring to FIG. 5, a catch jaw 121ba is formed on a lower side of the free end 121b of the cantilever member 121 to substantially prevent separation of the temperature sensor 20 from the sensor assembling part 120. For example, the catch jaw 121ba may have a wedge shape sloped in an assembling direction of the temperature sensor 20.

In some embodiments, the catch jaw 121ba has a wedge shape gradually sloped in the assembling direction of the temperature sensor 20 so that the insertion of the temperature sensor 20 into the sensor assembling part 120 may have relatively little resistance and removal of the temperatures sensor 20 from the sensor assembling part 120 may have a large resistance. Therefore, the temperature sensor 20 may be easily assembled into the sensor assembling part 120 and may not be easily separated from the sensor assembling part 120.

A stopper 121p may be provided at a position of the cantilever member 121 in the assembling direction. The stopper 121p regulates the position of the temperature sensor 20 between the fixed end 121a and the free end 121b. That is, the stopper 121p determines the assembling position of the temperature sensor 20 by preventing the temperature sensor 20 from penetrating further into the sensor assembling part 120.

As shown in FIGS. 4A and 4B, the sensor assembling part 120 includes guide walls 125 to guide the temperature sensor 20 in the assembling direction. A pair of guide walls 125 may be provided facing each other to guide the temperature sensor 20 in the assembling direction. The cantilever member 121 may be disposed between the pair of guide walls 125 and the cantilever member 121 and the pair of guide walls 125 may be spaced apart from each other by a predetermined distance. For example, the temperature sensor 20 may be assembled by being placed under the cantilever member 121 between the pair of guide walls 125.

The guide walls 125 may include assembling position guide parts 125g to guide the temperature sensor 20 into the assembling position. For example, the assembling position guide parts 125g may be sloped to approach each other, and thus, the width between the guide walls 125 may gradually decrease in the assembling direction.

That is, the assembling position guide parts 125g have a width therebetween which gradually decreases in the assembling direction, and thus, the sensor assembling part 120 may have a relatively wide entrance end and a relatively narrow opposite end. In other words, since the entrance end of the sensor assembling part 120 is relatively wide, the temperature sensor 20 may be easily introduced into the sensor assembling part 120 and appropriately guided to the assembling position. Thus, the temperature sensor 20 may be easily assembled.

The cantilever member 121 may be disposed between the pair of guide walls 125. The cantilever member 121 may include a tapered part 121g disposed between the assembling position guide parts 125g and having a gradually decreasing width. For example, the cantilever member 121 may include the tapered part 121g located at a predetermined location and decreasing in width from the free end 121b to the fixed end 121a.

As described above, the temperature sensor 20 may be assembled by simply inserting the temperature sensor 20 into the inner cover 110 and the temperature sensor 20 may be smoothly guided to the assembling position thereof in the assembling direction.

In a comparative example (not shown) for comparison with the previously described embodiment, a temperature sensor may be fixed to a bus bar having a screw hole by using a screw. In this case, however, an additional process is required to form the screw hole in the bus bar and due to a manual fastening process, errors such as misassembling and connection omissions may easily occur. However, according to at least one embodiment, temperature sensors 20 are assembled by simple insertions. Thus, the workability of the battery pack is improved and product errors such as misassembling and omissions are noticeably decreased.

As shown in FIG. 4A, the temperature sensor 20 may include a thermistor chip 25 to be assembled into the sensor assembling part 120 and a wire part 21 extending from the thermistor chip 25. The thermistor chip 25 may include a variable resistor having a temperature-dependent electric resistance. The wire part 21 may include electric wires to apply a driving voltage to the thermistor chip 25 and receive an electric output value from the thermistor chip 25 in response to the driving voltage.

In some embodiments, the wire part 21 extends from the thermistor chip 25, assembled in the sensor assembling part 120, to the exterior of the sensor assembling part 120 through the entrance end of the sensor assembling part 120. In these cases, the outwardly-extending wire part 21 is connected to a battery management system (BMS) that collects the operational statuses of the battery cells 10 such as the temperature, voltage, and current for monitoring the battery cells 10 and controlling the charging and discharging of the battery cells 10 based on the monitored results.

Referring back to FIG. 3, a plurality of sensor assembling parts 120 are provided and the sensor assembling parts 120 are arranged at different positions of the inner cover 110 to measure the temperatures at their respective positions. For example, the package body may include at least two battery cells 10 and the temperature sensors 20 positioned in the sensor assembling parts 120 may measure the temperatures at a plurality of positions. In some embodiments, the sensor assembling parts 120 are provided in a manner such that one temperature sensor 20 is allocated for two battery cells 10. The sensor assembling parts 120 may be arranged in a row in the arrangement direction Z1 of the battery cells 10.

In some embodiments, the sensor assembling parts 120 are arranged in an approximately center region of the inner cover 110. In other words, the sensor assembling parts 120 bring the temperature sensors 20 into contact with the topsides of the battery cells 10 at positions between the electrode terminals 10a of the battery cells 10.

The inner cover 110 may include bus bar assembling parts (or bus bar assembling portions) 130. The bus bars 15 may electrically connect neighboring battery cells 10. That is, the bus bars 15 may electrically connect electrode terminals 10a of neighboring battery cells 10, and thus, the battery cells 10 may be electrically connected to each other. For this, terminal holes 135 may be formed in the bus bar assembling parts 130 to expose the electrode terminals 10a. For example, a pair of terminal holes 135 may be formed in each bus bar assembling part 130 to expose two electrode terminals 10a and the exposed two electrode terminals 10a may be connected using a bus bar 15.

The bus bar assembling parts 130 may include assembling guides 131 configured to enclose corners of the bus bars 15 so as to define bus bar assembling positions. For example, each of the bus bar assembling parts 130 may include four assembling guides 131 configured to enclose four corners of a bus bar 15.

In some embodiments, the bus bars 15 are disposed above the bus bar assembling parts 130. However, the described technology is not limited thereto. For example, the bus bars 15 may be disposed under the bus bar assembling parts 130. As long as the assembling positions of the bus bars 15 are regulated by interference of the bus bar assembling parts 130, the bus bars 15 may be disposed at either of the upper and lower sides of the bus bar assembling parts 130.

The inner cover 110 may be formed of an electrical insulator to avoid electric interference with the bus bars 15 forming charging and discharging passages between the battery cells 10. For example, the inner cover 110 may be formed of an injection-molded electrical insulator. In this case, the sensor assembling parts such as parts 120 or the bus bar assembling parts 130 may be formed in one piece with the inner cover 110 by injection molding.

In addition, as shown in FIG. 1, a cover member 180 may be disposed on the inner cover 110. For example, the cover member 180 may cover the bus bars 15 and the electrode terminals 10a for electrically insulating the battery pack. For this, the cover member 180 may be formed of an electrical insulator. The cover member 180 may expose electrode terminals 10a of battery cells 10 disposed on both ends of the battery cells 10 in the arrangement direction Z1.

As described above, according to at least one embodiment, a screw coupling method is not used to assemble the temperature sensors. Instead, sensor assembling parts are formed in the inner cover covering the topsides of the battery cells so that the temperature sensors may be easily assembled through simple insertions. Therefore, the process for coupling the temperature sensors to the battery cells does not require screws. In addition, since a manual screw coupling process which inevitably results in misassembling or connection omissions is not required, the quality and stability of the battery pack may be improved.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the described technology have been described with reference to the figures, it will be understood by those of ordinary skill in the art that various changes in form and details may be made therein without departing from the spirit and scope of the present invention as defined by the following claims.

What is claimed is:

1. A battery pack, comprising:
a battery cell;
a temperature sensor configured to measure the temperature of the battery cell; and
an inner cover substantially covering the battery cell, wherein the inner cover comprises a sensor attachment configured to attach the temperature sensor to the battery cell,
wherein the sensor attachment comprises a cover body and a cantilever member,
wherein the cantilever member comprises a fixed end connected to the cover body and an opposite free end not connected to the cover body, the opposite free end being in direct contact with the temperature sensor, and
wherein the sensor attachment comprises a pair of guide walls configured to guide the temperature sensor while the temperature sensor is being attached to the battery cell, wherein the cantilever member is formed between the guide walls and wherein the cantilever member is configured to apply pressure to the temperature sensor.

2. The battery pack of claim 1, wherein the sensor attachment pushes the temperature sensor against the battery cell.

3. The battery pack of claim 1, wherein the sensor attachment is configured to receive the temperature sensor such that the temperature sensor pushes up the free end and slides toward the fixed end and wherein the cantilever member is configured to press the temperature sensor against the battery cell by resilience thereof.

4. The battery pack of claim 1, wherein the cantilever member further comprises a pressure adjusting portion and wherein the distance from the pressure adjusting portion to the battery cell decreases in a direction from the fixed end to the free end.

5. The battery pack of claim 4, wherein the pressure adjusting portion is sloped downwardly toward the battery cell.

6. The battery pack of claim 1, wherein the cantilever member further comprises a catch jaw formed on a lower side of the free end and configured to substantially prevent separation of the temperature sensor from the sensor attachment.

7. The battery pack of claim 6, wherein the sensor attachment is configured to receive the temperature sensor in an assembling direction and wherein the catch jaw has a wedge shape with a slope increasing in the assembling direction.

8. The battery pack of claim 1, wherein the cantilever member further comprises a stopper formed between the fixed end and the free end so as to define the position of the temperature sensor.

9. The battery pack of claim 1, wherein the temperature sensor is placed between the guide walls and under the cantilever member.

10. The battery pack of claim 1, wherein sensor attachment is configured to receive the temperature sensor in an assembling direction and wherein each of the guide walls comprises an assembling position guide portion having a width which decreases in the assembling direction.

11. The battery pack of claim 1, wherein the battery cell includes a plurality of battery cells, wherein the battery cells are electrically connected to each other through a plurality of bus bars, and wherein the inner cover comprises a bus bar assembling portion defining the positions of the bus bars.

12. The battery pack of claim 11, wherein the bus bars are located above or below the bus bar assembling portion.

13. The battery pack of claim 11, wherein the bus bar assembling portion has a pair of terminal holes exposing neighboring electrode terminals of the battery cells.

14. The battery pack of claim 11, wherein the bus bar assembling portion comprises an assembling guide enclosing a corner of the bus bars to define the positions the bus bars.

15. The battery pack of claim 14, wherein the bus bar assembling portion comprises four assembling guides corresponding to four corners of the bus bars.

16. The battery pack of claim 1, wherein the inner cover is formed of an injection-molded electrical insulator.

17. The battery pack of claim 1, wherein the battery cell comprises a plurality of battery cells and wherein the inner cover substantially covers the battery cells.

* * * * *